United States Patent [19]

Sharp

[11] 4,128,753
[45] Dec. 5, 1978

[54] LASER BEAM WELDING

[75] Inventor: Charles M. Sharp, Nether Heyford, England

[73] Assignee: BOC Limited, London, England

[21] Appl. No.: 820,374

[22] Filed: Jul. 29, 1977

[30] Foreign Application Priority Data

Aug. 3, 1976 [GB] United Kingdom ............... 32283/76

[51] Int. Cl.$^2$ .............................................. B23K 9/02
[52] U.S. Cl. ................................................ 219/121 L
[58] Field of Search ...................... 219/121 L, 121 LM

[56] References Cited

U.S. PATENT DOCUMENTS

| 4,000,392 | 12/1976 | Banas et al. | ................ | 219/121 LM |
| 4,010,345 | 3/1977 | Banas et al. | ...................... | 219/121 L |

OTHER PUBLICATIONS

Electronic Packaging & Production, Mar. 1971 pp. 222-224, 226, 228, 230, & 232.

*Primary Examiner*—J. V. Truhe
*Assistant Examiner*—Fred E. Bell
*Attorney, Agent, or Firm*—Dennison, Dennison, Meserole & Pollack

[57] ABSTRACT

Laser beam welding apparatus comprising a body with a passage through which the laser beam is directed and focused to a position outside the body closely adjacent to a terminal portion of the passage. A second passage opens into the first to direct a transverse jet of shielding gas to sweep away the plasma formed during welding through an aperture in the opposite wall of the first passage. Since the welding zone is virtually enclosed by the body the incidence of air entrainment by the transverse jet of shielding gas is minimized.

8 Claims, 3 Drawing Figures

LASER BEAM WELDING

FIELD OF THE INVENTION

This invention relates to welding and more particularly to welding by use of a laser beam.

BACKGROUND AND SUMMARY OF THE INVENTION

When effecting deep penetration welds using a laser beam, a plasma plume comprising vaporised metal and ionized welding gas is usually established over the welding zone between the workpieces being welded and the head of the welding apparatus. This plasma tends to absorb part of the energy of the laser beam which has to pass through the plasma before it impinges on the welding zone. In this way the amount of energy from the laser beam available for welding is reduced. It has been proposed to provide a tube terminating between the head of the welding apparatus and the workpieces through which a transverse jet of gas is passed to act on and to destroy the plasma. However, a disadvantage of such a system is that ambient air is entrained by the transverse jet and brought into the welding zone tending to cause porosity in the weld and/or changes in composition due to oxidation.

The invention seeks to overcome this disadvantage and accordingly resides in laser welding apparatus comprising: a body including a first passage defining an optical path for a laser beam; means for directing a laser beam along said passage and for focussing such beam to a position outside the body closely adjacent to a terminal portion of said passage at which workpieces to be welded together are, in use, located; the body including a second passage having an outlet in said terminal portion of the first passage and which is adapted to direct a jet of shielding gas transversely of said first passage to impinge on plasma formed within said terminal portion during welding; and the wall of said terminal portion of the first passage having an aperture so disposed as to permit said jet to sweep plasma away from the welding zone through the aperture.

The term 'shielding gas' is used herein to mean a gas which in use tends to exclude ambient air from the welding zone and which does not react with any constituents in the weld pool or otherwise adversely affect the weld. A preferred gas is helium.

It is a feature of the invention that the terminal portion of the first passage in use extends to a position closely adjacent to the workpieces thereby assisting in the shielding of the welding zone from air entrainment. Furthermore, the disposition of the outlet from said second passage is such that the transverse jet which it directs can be made to impinge on the plasma substantially without bringing air into the welding zone. The apparatus may also comprise shielding means — i.e. means adapted to restrict the access of ambient air to the welding zone — fast with the body and extending downstream of the apperture in the wall of the terminal portion of the first passage in the sense of the intended direction of flow of shielding gas and plasma through that aperture.

Either transmitting optics or reflecting optics can be used for focussing the laser beam and the focussing means may comprise a lens supported in the first passage of the body or a concave mirror supported externally of the body. In the former case the body may include an inlet for pressurised shielding gas which opens into the first passage between the lens and the terminal portion of the passage, so that a stream of such gas can be directed through the passage to further shield the welding zone. Such gas may also assist in cooling the lens and protecting the lens from fume and spatter from the welding zone.

The apparatus may further comprise clamping means for clamping workpieces to be welded together to a support structure, the clamping means comprising surfaces complementary to surfaces of the aforesaid body whereby said surfaces of the body and clamping means can cooperate to restrict the access of ambient air to the welding zone. The body and clamping means may be adapted for relative movement, whereby, in use, a continuous weld seam can be produced between the workpieces clamped by the clamping means, in which case the clamping means may comprise elongate surfaces complementary to lateral surfaces of the body whereby said surfaces of the body and clamping means can cooperate to restrict the access of ambient air to the welding zone throughout such relative movement. In any such embodiment the outlet from the second passage in the body is preferably so disposed with regard to the direction of the relative movement for which the body and clamping means are adapted that the transverse jet of shielding gas can be directed along the most newly welded areas of such a seam.

BRIEF DESCRIPTION OF THE DRAWINGS

The invention will now be more particularly described, by way of example, with reference to the accompanying drawings, in which.

Like reference numerals are used to denote like parts in the two embodiments.

DESCRIPTION OF THE PREFERRED EMBODIMENTS

Figure 1:
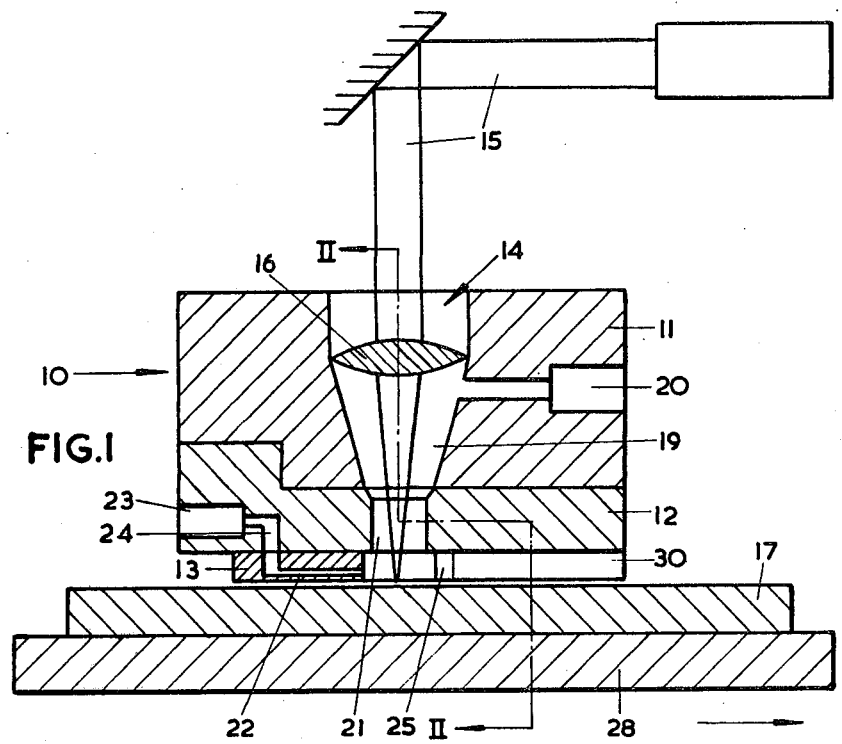
FIG. 1 is a diagrammatic side view in cross-section of one embodiment of the apparatus according to the invention.
Figure 2:
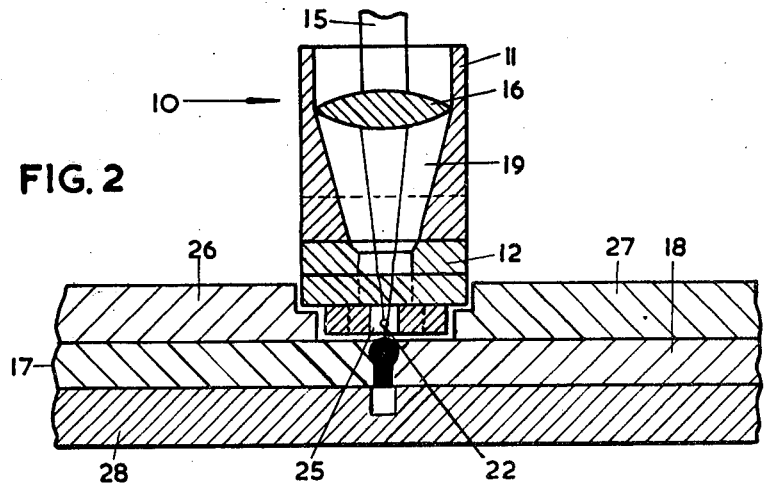
FIG. 2 is a diagrammatic end view in cross-section of the apparatus of FIG. 1.

Referring to FIGS. 1 and 2 of the accompanying drawings there is shown laser welding apparatus comprising a body 10 constructed from three sections 11, 12, and 13 bolted together in series. Bores in each section collectively define a passage 14 extending vertically through the body to provide an optical path for a beam 15 from e.g. a 2Kw carbon dioxide laser. A KCl lens 16 is supported in the portion of passage 14 within body section 14 for focussing the beam onto two workpieces 17 and 18 to be butt welded together.

The lens 16 defines with the portion of passage 14 within the body section 11 a cavity 19 for pressurised helium gas introduced through an inlet passageway 20. A stream of helium is directed through the outlet 21 of the cavity 19 which is provided by the terminal portion of passage 14 in body sections 12 and 13.

The helium fills the cavity 19 and contacts the lens 16 to assist the cooling thereof as well as protecting the lens from fume and spatter from the welding zone. The stream of helium which issues from the outlet of the cavity impinges on the welding zone to shield that zone from the ingress of ambient air.

The base section 13 of the body 10 extends to a position closely adjacent to the workpieces onto which the laser beam is focussed. The deep penetration weld produced by the laser produces a plasma of metal vapour and ionized welding gas above the welding zone and extending into the portion of passage 14 in section 13.

A narrow diameter bore 22 extends through body section 13 and terminates in the terminal portion of passage 14. The bore 22 communicates with a gas inlet 23 in body section 12 by means of a passageway 24 linking the two sections. Helium is fed under pressure to inlet 23 to produce a high velocity jet which is directed from bore 22 transversely of passage 14 to impinge on and sweep away the aforesaid plasma through a slot 25 formed in the wall of the body section 13 diametrically opposite to the bore 22. Since the welding zone and plasma is virtually enclosed by base section 13 there is little or no likelihood of air entrainment by the high velocity jet of helium.

The workpieces 17 and 18 are clamped by clamping members 26 and 27 onto a slotted table 28 which is moved, for example by a lead screw, horizontally beneath the body 10 in the direction of the arrow shown in FIG. 1 so as to produce a continuous weld seam between the workpieces.

The direction of the high velocity helium jet from bore 22 is along the seam in a direction such that it covers the most newly welded areas which are still partially molten, thereby tending to exclude air from such areas. In the above described construction the slot 25 can be only relatively short to facilitate the drilling of bore 22. The slot 25 is therefore effectively extended by a separate trailing shield part 30 bolted onto body section 12.

The opposed elongate surfaces of the clamping members 26 and 27 are stepped (as seen in FIG. 2) to be complementary to the adjacent lateral surfaces of the body 10 so that only narrow passages exist between these surfaces. The surfaces therefore cooperate to assist in restricting the acess of ambient air to the welding zone throughout the welding operation.

In one specific construction of apparatus as shown in FIGS. 1 and 2 the diameter of the terminal portion of the passage 14 in body section 13 is 6mm, the diameter of the bore 22 is 2mm, and the helium flow rate through inlet 20 and through bore 22 is 5 liters per minute. It will be appreciated that the relative flow rates of gas introduced into the inlets 20 and 23 must be carefully selected to produce the maximum plasma destruct action whilst maintaining adequate protection of the lens 16.

Figure 3:
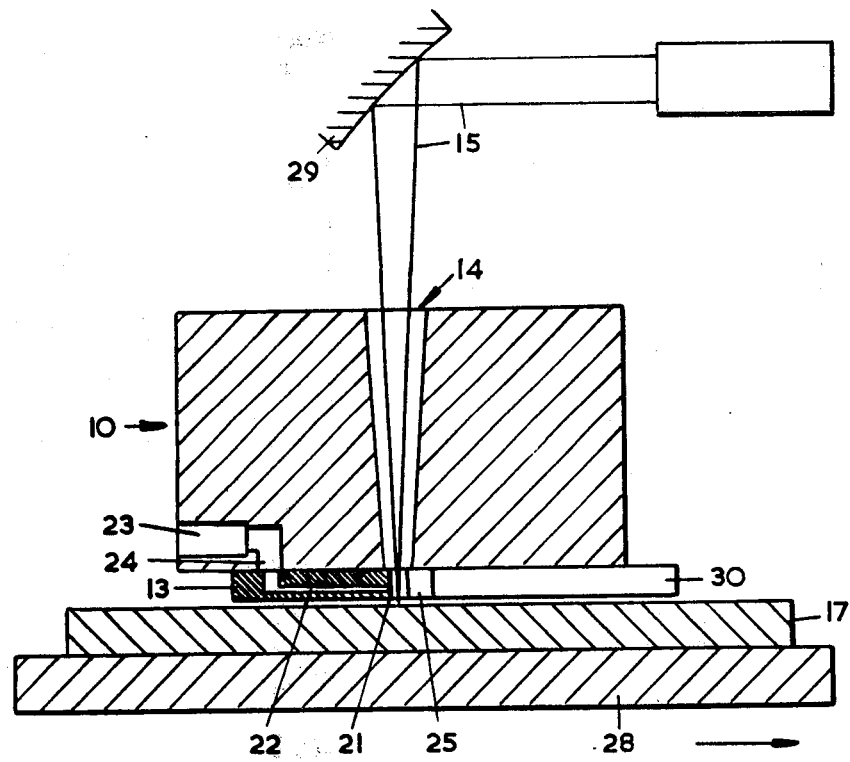
FIG. 3 is a diagrammatic side view in cross-section of a second embodiment of apparatus according to the invention.

Referring now to FIG. 3 this shows a second embodiment of apparatus according to the invention in which the laser beam 15 is focussed not by a lens but by a gold plated concave mirror 29 supported externally of the body 10. The body in this instance is constructed from two bored sections which collectively define a vertical passage 14 of smaller diameter than the corresponding passage in the embodiment of FIGS. 1 and 2. As before a bore 22 is provided in the body to direct a high velocity jet of helium transversely of the passage 14 to sweep away the plasma produced during welding through a slot 25. In this embodiment, however, the terminal portion 21 of the passage 14 is sufficiently narrow for effective shielding of the welding zone to be achieved without the assistance of an axial stream of shielding gas through the passage.

I claim

1. Laser welding apparatus comprising:
   a body including a first passage defining an optical path for a laser beam;
   means for directing a laser beam along said passage and for focussing such beam to a position outside the body closely adjacent to a terminal portion of said passage at which workpieces to be welded together are, in use, located;
   the body including a second passage having an outlet in said terminal portion of the first passage and which is adapted to direct a jet of shielding gas transversely of said first passage to impinge on plasma formed within said terminal portion during welding;
   and the wall of said terminal portion of the first passage having an aperture so disposed as to permit said jet to sweep plasma away from the welding zone through the aperture.

2. Apparatus according to claim 1 wherein said focussing means comprises a lens supported in said first passage.

3. Apparatus according to claim 2 wherein the body includes an inlet for pressurised shielding gas which opens into the first passage between the lens and said terminal portion of the passage.

4. Apparatus according to claim 1 wherein said focussing means comprises a concave mirror supported externally of said body.

5. Apparatus according to claim 1 comprising shielding means fast with the body and extending downstream of the aperture in the wall of said terminal portion in the sense of the intended direction of flow of shielding gas and plasma through the aperture.

6. Apparatus according to claim 1 and further comprising clamping means for clamping workpieces to be welded together to a support structure, the clamping means comprising surfaces complementary to surfaces of said body whereby said surfaces of the body and clamping means can cooperate to restrict the access of ambient air to the welding zone.

7. Apparatus according to claim 6 wherein the body and clamping means are adapted for relative movement whereby, in use, a continuous weld seam can be produced between workpieces clamped by the clamping means, and wherein the clamping means comprises elongate surfaces complementary to lateral surfaces of the body whereby said surfaces of the body and clamping means can cooperate to restrict the access of ambient air to the welding zone throughout such relative movement.

8. Apparatus according to claim 7 wherein the outlet from said second passage in said body is so disposed with regard to the direction of the relative movement for which the body and clamping means are adapted, that said jet of shielding gas can be directed along the most newly welded areas of such a seam.

* * * * *